United States Patent [19]

Van Dongen et al.

[11] Patent Number: 5,461,095

[45] Date of Patent: Oct. 24, 1995

[54] BLOCK COPOLYMER COMPOSITION, HOT MELT ADHESIVE COMPOSITION CONTAINING IT, AND PROCESS FOR THE PREPARATION THEREOF

[75] Inventors: Arie Van Dongen; Jacqueline M. Veurink; Jeroen Van Westrenen, all of Amsterdam, Netherlands

[73] Assignee: Shell Oil Company, Houston, Tex.

[21] Appl. No.: 265,072

[22] Filed: Jun. 24, 1994

[30] Foreign Application Priority Data

Aug. 25, 1993 [EP] European Pat. Off. .............. 93202500

[51] Int. Cl.$^6$ .............................. C08K 5/3492; C08K 5/52
[52] U.S. Cl. ........................... 524/100; 524/151; 524/153
[58] Field of Search ...................................... 524/100, 151, 524/153

[56] References Cited

U.S. PATENT DOCUMENTS 4,260,066  4/1981  Hannon et al. ...................... 215/12 R
4,835,200  5/1989  St. Clair .

FOREIGN PATENT DOCUMENTS

0479754A1  4/1992  European Pat. Off. .
03285978A  12/1991  Japan .

Primary Examiner—Kriellion S. Morgan
Attorney, Agent, or Firm—Donald F. Haas

[57] ABSTRACT

A block copolymer composition comprising:
(a) 100 parts by weight of a linear block copolymer comprising two polystyrene endblocks and one poly-(conjugated diene) midblock, which block copolymer is obtained via a coupling reaction using a diglycidyloxy coupling agent and which block copolymer has a styrene content in the range of from 10 to 50% by weight based on the total weight of block copolymer and an apparent molecular weight in the range of from 100,000 to 400,000; and
(b) 0.1 to 2 parts by weight of a stabilizer package consisting of:
(b1) 6-(4-hydroxy-3,5-di-t-butylanilino)-2,4-bis-octylthio-1,3,5-triazine, and
(b2) a tris-(nonylated phenyl) phosphite, in a weight ratio b1/b2 in the range of from 0.5 to 0.1.

The block copolymer composition can be suitably applied in hot melt adhesive compositions.

A process for preparing the block copolymer composition comprising the subsequent steps of preparing lithium terminated styrene-conjugated diene diblock copolymer chains, coupling these polymer chains by adding the diglycidyloxy coupling agent, adding the stabilizer package and recovering the block copolymer composition.

13 Claims, No Drawings

BLOCK COPOLYMER COMPOSITION, HOT MELT ADHESIVE COMPOSITION CONTAINING IT, AND PROCESS FOR THE PREPARATION THEREOF

BACKGROUND OF THE INVENTION

The present invention relates to a block copolymer composition, to a hot melt adhesive composition comprising this block copolymer composition and to a process for preparing such block copolymer composition.

European Patent Application No. 0,479,754 discloses a process for decolorizing vinyl aromatic-conjugated diene copolymers which are obtained by anionic polymerization using an alkali metal initiator, optionally followed by coupling of living copolymer chains by the addition of a coupling agent to the polymerization mixture. Diepoxy compounds were mentioned among many others as suitable coupling agents. As the stabilizer package there was actually used a combination of tris(nonyl-phenyl)phosphite TNPP) and octadecyl-3-(3',5'-di-tert.butyl-4'-hydroxyphenyl)propionate (IRGANOX® 1076, IRGANOX® is a trade). The decolorization process involves the addition of a monocarboxylic acid of the formula R—COOH with R representing a group containing 2 to 4 carbon atoms. It will be understood that the use of acids for obtaining color-stable polymers is undesirable from a manufacturing point of view, as the use of acids puts severe demands upon the equipment due to their corrosive nature. Also in view of safety and environmental hazards it is preferred to avoid the use of acids.

From U.S. Pat. No. 4,835,200, a color stable, heat resistant hot melt adhesive composition is known comprising a monoalkenyl arene-conjugated diene block copolymer prepared by using a bromide based coupling agent, a tackifying resin, optionally a plasticizing oil and/or a petroleum wax and a specific stabilizer composition. This stabilizer composition essentially consists of four components: (i) a thio compound being 6-(4-hydroxy-3,5-di-t-butylanilino)-2,4-bis-octylthio-1,3,5,-triazine, (ii) a phenolic antioxidant, (iii) a tris-(nonylated phenyl)phosphite and (iv) an aliphatic compatible epoxy compound. The stabilizer composition employed contains a relatively large number of components, which may be the result of the use of a bromide containing coupling agent. Apart from the relatively high costs of such extensive stabilizer composition, the use of a coupling agent containing bromide is undesirable for environmental reasons. Upon waste disposal, e.g. by incineration, of articles containing the hot melt adhesive composition disclosed in said U.S. patent, there is always the risk of releasing toxic bromine compounds into the environment. Hence, there is a need for hot melt adhesive compositions which are free of bromide residues, and of halide residues in general, and which do not require the need of extensive stabilizer compositions for obtaining an adhesive composition having the desired color stability and resistance to heat degradation.

From Japanese Patent Application No. 03/285978, an adhesive composition is known comprising a linear block copolymer of a monoalkenyl aromatic compound and a conjugated diene, a tackifier resin and optionally a softening agent. In addition hereto, small amounts of stabilizers such as antioxidants and UV stabilizers may also be present. Said block copolymer is obtained by first preparing living (i.e. lithium terminated) block copolymer chains in a hydrocarbon solvent and subsequently coupling said living block copolymer chains by means of a diglycidyloxy compound of the general formula

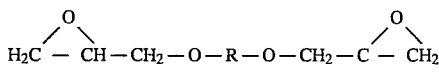

wherein R inter alia may be a group of the general formula

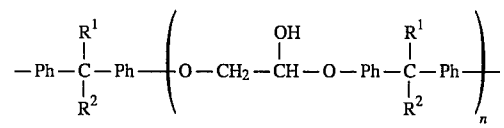

wherein $R^1$ and $R^2$ both represent hydrogen, phenyl or $C_1$-$C_{20}$ alkyl, Ph stands for phenylene and n is an integer in the range of from 0 to 10, whereby the n=0 compound occurs in an amount of 95 % by weight or more of the total weight of the diglycidyloxy compound. Actually described stabilizers are phosphorus containing antioxidants such as TNPP and UV absorbers of the benzotriazole and benzophenone type. According to said Japanese patent application, the best results are achieved when using a mixture of two different diglycidyloxy compounds as the coupling agent. It seems, however, more easy and effective from a compounding point of view to use only one diglycidyloxy compound as the coupling agent.

It is an object of the present invention to provide block copolymer compositions which have excellent color stability, shear stability and heat stability and which, when applied in hot melt adhesive compositions, result in the adhesive composition having excellent adhesive properties. It is a further object of the present invention to provide such block copolymer compositions without the use of acids, halides or any other hazardous compounds. Finally, it is a general object of the present invention to provide a process for effectively preparing the before-mentioned excellent block copolymer compositions. This inter alia implies that it is an object of the present invention to provide a process wherein coupling efficiencies of 75% or more, preferably 80% or more, can be realized. The coupling efficiency is defined as the percentage of coupled polymer chains relative to the sum of coupled and uncoupled polymer chains.

SUMMARY OF THE INVENTION

Accordingly, the present invention relates to a block copolymer composition comprising:

(a) 100 parts by weight of a linear block copolymer comprising two polystyrene endblocks and one poly(conjugated diene) midblock, which block copolymer is obtained by coupling together two lithium terminated diblock copolymer chains, which have been prepared by anionic polymerization in an inert hydrocarbon solvent using a organomonolithium polymerization initiator, by means of a diglycidyloxy coupling agent consisting of at least one diglycidyloxy compound of general formula (I)

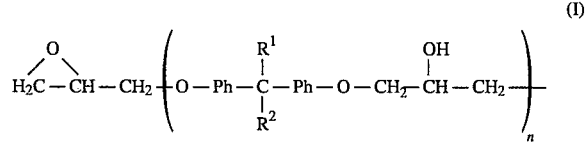

(I)

-continued

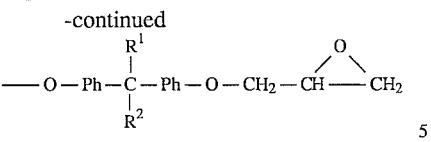

wherein Ph represents a 1,4-phenylene group, $R^1$ and $R^2$ independently represent hydrogen, an alkoxy group or an alkyl group having 1 to 4 carbon atoms and n is an integer of 0, 1 or 2 with the proviso that the diglycidyloxy compound of n=0 constitutes at least 85% by weight of the total weight of the diglycidyloxy coupling agent, said linear block copolymer having a styrene content in the range of from 10 to 50% by weight based on the total weight of block copolymer and a peak molecular weight in the range of from 100,000 to 400,000;

(b) 0.1 to 2 parts by weight of a stabilizer package consisting of:
 (b1) 6-(4-hydroxy-3,5-di-t-butylanilino)-2,4-bis-octylthio-1,3,5-triazine, and
 (b2) a tris-(nonylated phenyl) phosphite, in a weight ratio b1/b2 in the range of from 0.5 to 0.1.

DETAILED DESCRIPTION OF THE INVENTION

The peak (or apparent) molecular weight is the molecular weight as determined by Gel Permeation Chromatography using polystyrene calibration standards as described in ASTM D 3536.

The styrene content of the coupled linear block copolymer can not be too high, i.e. higher than 50% by weight, as in such a case the block copolymer would be too resinous and hard to be suitably applied in hot melt adhesives. On the other hand, too low a styrene content, i.e. lower than 10% by weight, is also undesirable because then the block copolymer would be too soft to handle. It is preferred that the styrene content of the block copolymer is in the range of from 12 to 40% by weight.

The conjugated diene, which is polymerized to form the poly(conjugated diene) midblock, may be selected from butadiene, isoprene, piperylene or mixtures thereof. It is however preferred that the conjugated diene is butadiene or isoprene, of which isoprene is most preferred.

According to the present invention the linear block copolymer to be applied as component (a) is prepared via coupling living, i.e. lithium terminated, styrene-conjugated diene diblock copolymers with a diglycidyloxy coupling agent of general formula (I). Examples of suitable diglycidyloxy coupling agents are those in which:

(a) $R^1$ and $R^2$ both represent hydrogen (bisphenol F type);
(b) $R^1$ and $R^2$ both represent methyl (bisphenol A type); and
(c) $R^1$ represents hydrogen and $R^2$ represents methyl (bisphenol AD type).

A preferred type is the bisphenol A type, i.e. the groups $R^1$ and $R^2$ of formula (I) both represent methyl, whereby the diglycidyloxy compound of n=0 constitutes at least 85% by weight, preferably at least 90% by weight, of the diglycidyloxy coupling agent. It will be understood that the α-glycol content (α-GC) of the diglycidyloxy coupling agent cannot be too high, as this would be detrimental to the coupling efficiency. Accordingly, it is preferred that the α-GC is below 100 millimoles per kilo (mmol/kg) of diglycidyloxy coupling agent, more preferably below 60 mmol/kg. Such α-glycol groups have a structure according to formula (II) and may be formed during the preparation of the diglycidyloxy coupling agent.

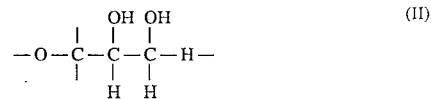

The phenolic triazine compound serving as component (1) of the stabilizer package used in the composition of the invention is 6-(4-hydroxy-3,5-di-t-butylanilino) -2,4-bis-octylthio-1,3,5-triazine. It is a UV stabilizer which is commercially available under the trade name IRGANOX® 565 is trade mark).

The tris-(nonylated phenyl) phosphite, which serves as an antioxidant thus preventing the oxidative degradation of the block copolymer composition according to the invention, may be either tris(nonyl-phenyl)phosphite (TNPP) or tri-(mixed mono- and diphenyl) phosphite. Examples of commercially available tris-(nonylated phenyl) phosphites are POLYGARD®, NAUGARD®, ANNULEX TNPP and IRGAPHOS® TNPP (POLYGARD®, NAUGARD®, ANNULEX and IRGAPHOS® are trade marks). POLYGARD® is a tri(mixed mono- and dinonyl phenyl) phosphite.

The weight ratio between the phenolic triazine UV stabilizer on the one hand and the tris-(nonylated phenyl) phosphite antioxidant on the other hand should be within the range of from 0.5 to 0.1 in order to obtain a color stable and heat resistant block copolymer composition. The best results are achieved when said weight ratio is in the range of from 0.4 to 0.15.

The block copolymer composition according to the present invention is very suitable to be used in hot melt adhesive compositions. Accordingly, the present invention also relates to a hot melt adhesive composition comprising:

(a) 100 parts by weight of the block copolymer composition as described hereinbefore;
(b) 20–400 parts by weight of a tackifying resin; and
(c) 0–200 parts by weight of a softening agent.

Suitable tackifying resins are the conventional materials known in the art. They include, for example, coumarone-indene resins, polyterpene resins, polyindene resins, poly(α-pinene) resins, poly(α-pinene) resins and modified as well as unmodified rosins. Resins based on styrene or substituted styrenes, such as α-methylstyrene, may also be used. The softening agent also may be any material known to be suitable as a softening agent. Examples are paraffinic oils, naphthenic oils and mixtures thereof as well as mineral oils.

The present invention also relates to a process for preparing the block copolymer compositions described hereinbefore, which process comprises the steps of:

(1) preparing lithium terminated styrene-conjugated diene diblock copolymer chains ("living" chains) in an inert hydrocarbon solvent using an organolithium polymerization initiator;

(2) coupling these diblock copolymer chains by means of a diglycidyloxy coupling agent consisting of at least one diglycidyloxy compound of general formula (I)

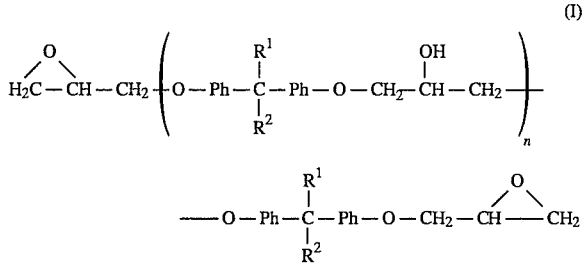

wherein Ph represents a 1,4-phenylene group, $R^1$ and $R^2$ independently represent hydrogen, an alkoxy group or an alkyl group having 1 to 4 carbon atoms and n is an integer of 0, 1 or 2 with the proviso that the diglycidyloxy compound of n=0 constitutes at least 85% by weight of the total weight of the diglycidyloxy coupling agent;

(3) adding the stabilizer package consisting of 6-(4-hydroxy-3,5-di-t-butylanilino)-2,4-bis-octylthio-1,3,5-triazine and a tris-(nonylated phenyl) phosphite in a weight ratio in the range of from 0.5 to 0.1 via
  (i) adding a solution of the stabilizer package dissolved in an inert hydrocarbon solvent, preferably the same as used in the polymerization; or
  (ii) separately adding the components of the stabilizer package as solutions in an inert hydrocarbon solvent, preferably the same as used in the polymerization, whereby the solution of the tris-(nonylated phenyl) phosphite is added first; and (4) recovering the block copolymer composition.

The preferred diglycidyloxy coupling agent is the diglycidyloxy compound of formula (I), wherein $R^1$ and $R^2$ of formula (I) both represent methyl and wherein the diglycidyloxy compound of n=0 constitutes at least 85% by weight, preferably at least 90% by weight, of the diglycidyloxy coupling agent. Suitable diglycidyloxy compounds, which are commercially available, are those of the EPIKOTE® 828 series, the EPIKOTE® 827 series and the EPON® series (EPIKOTE® and EPON® are trade marks). Specific examples are EPIKOTE® 828 EL, EPON® 825, EPON® 827 and EPON® 828.

Epoxy resins suitable for the invention compositions have molecular weights generally within the range of 86 to about 10,000, preferably about 200 to about 1500. The commercially-available epoxy resin EPON® Resin 828 is a reaction product of epichlorohydrin and 2,2-bis(4-hydroxyphenyl-propane) (bisphenol-A) having a molecular weight of about 400, an epoxide equivalent (ASTM D-1652) of about 185–192, and an n value (from the formula above) of about 0.13. Other examples of aromatic epoxy resins are liquid resins such as EPON® 825, a reaction product of epichlorohydrin and bisphenol-A with an n value of about 0.04, EPON® 826, a reaction product of epichlorohydrin and bisphenol-A with an n value of about 0.08, and solid resins such as EPON® 1001, a reaction product of epichlorohydrin and bisphenol-A with an n value of about 2.3, EPON® 1002, a reaction product of epichlorohydrin and bisphenol-A with an n value of about 3.4, EPON® 1031, a reaction product of epichlorohydrin and tetraphenylol ethane with an epoxide equivalent weight of about 220, and the like.

In a preferred embodiment of the process according to the present invention, the diglycidyloxy coupling agent is preheated before being added to the living diblock copolymer solution to reduce the water content. This preheating conveniently is carded out for a period of 5–20 hours at a temperature of 100°–150° C. This preheating may increase the coupling efficiency (CE), which is defined as the percentage of living diblock copolymer chains being coupled relative to the total number of living diblock copolymer chains being present just before coupling. A high CE (80% or higher) is necessary in order to finally obtain a block copolymer composition having the desired properties.

The inert hydrocarbon solvent may be any solvent known in the art to be suitably applied as a polymerization solvent. Examples of suitable inert hydrocarbon solvents are cyclic aliphatic hydrocarbons such as cyclohexane and cyclopentane, and mixtures thereof with linear or branched aliphatic hydrocarbons such as n-hexane and isopentane. Particularly suitable are cyclohexane, cyclohexane/n-hexane mixtures, cyclohexane/isopentane/n-hexane mixtures, cyclopentane and cyclopentane/isopentane mixtures. Cyclohexane/isopentane/n-hexane mixtures, cyclohexane and cyclopentane are preferred.

The organolithium initiator may be any organic lithium compound which is commonly known to act as an initiator in polymerization reactions. A preferred class of organolithium compound are alkyl lithium compounds, wherein the alkyl group may be a linear alkyl group or a cycloalkyl group. Preferred alkyl lithium compounds are n-butyl lithium and sec-butyl lithium, with sec-butyl lithium being most preferred.

The addition of the stabilizer package (step (3)) most suitably is carded out in the absence of oxygen in order to allow the stabilizer package to have an optimum effect. This is most conveniently realized by purging the reaction vessel with nitrogen before the start of the polymerization reaction.

The reactions at the different stages of the process may be carded out at equal or different temperatures within the range of from 30° C. to 120° C., preferably 40° C. to 90° C.

The last step of the process, i.e. the recovery of the block copolymer, may be performed by any conventional recovery technique. Preferred techniques are flashing or water coagulation, followed by drying the polymer at a temperature between 30° and 100° C. Water coagulation is preferred. In the event water coagulation is used, it is preferred to use water which is free of oxygen. Such oxygen-free water may for instance be obtained by degassing water under vacuum.

The invention is further illustrated by the following examples without restricting the scope of the invention to these specific embodiments.

Example 1

A SIS (styrene-isoprene-styrene) block copolymer was prepared as follows.

To a 30 l reactor 19.7 l of cyclohexane was added, which was stripped for 30 minutes with nitrogen. After addition of 436 g of styrene, the reactor content was titrated at 50° C. with a 3% wt solution of sec-butyllithium (s-BuLi) in cyclohexane to scavenge reactive impurities. Hereafter, 40 mmol s-BuLi was added and the temperature was maintained at 50° C. After 30 minutes the living polystyrenyl block had been formed. Subsequently, 2125 g of isoprene was added within 25 minutes. The temperature was raised to 60° C. and this was maintained for 50 minutes. Hereafter, EPIKOTE® 828 EL resin (2,2-bis(glycidyloxyphenyl)propane) in 5 gram THF was added in such amount that the EGC (Epoxy Group Content) of the coupling agent in millimoles corresponded with 40 mmol of living diblock copolymer chains. The reaction mixture was kept at 60° C. for 50 minutes.

Relevant data as to EPIKOTE® 828 EL resin:

α-GC: 45 mmol/kg $n_1/n_0$: 4.3 mole %, corresponding with a content of the n=0 compound of 92% by weight EGC: 5650 mmol/kg Solution viscosity: 8,900 Pa.s Analysis with Gel Permeation Chromatography using polystyrene calibration standards (ASTM D 3536) revealed that the coupling efficiency was 84% and that the peak molecular weight of the SIS block copolymer was 171,000. The peak molecular weight of the polystyrene endblocks turned out to be 10,900. The polystyrene content of the SIS block copolymer was determined according to ASTM D 3314 and was 17% by weight.

Example 2

A sample of 1800 g of the polymer solution obtained in Example 1 was taken and transferred to a 3 l reactor under nitrogen, after which a cyclohexane solution containing 0.4% wt of TNPP and 0.1% wt of IRGANOX 565 was added, said weight percentages being based on the total weight of block copolymer. During the addition the solution was kept at 60° C. whilst stirring. The solvent was subsequently removed by batch wise water coagulation using batches initially containing 2 l degassed water, followed by drying the polymer in an oven at 40° C. for 5–6 hours.

The results are listed in Table I.

The MWR (Molecular Weight Retention, expressed in %) of the polymer is determined by the calculating the ratio between the square root of the quotient of the solution viscosity of the polymer after and before testing in a Brabender mixer at 160° C. in the presence of air. It is accordingly a measure for the stability of the block copolymer composition. Solution viscosities are measured at 25° C. in a 25% by weight toluene solution.

The testing in a Brabender mixer is performed as follows. The pure polymer material is added in a cup. This cup has a temperature of 140° C. The cup is filled with polymer for ⅘, leaving ⅕ of open space containing air. The blades of the mixer are set at 50 rpm (rotations per minute). Due to shear, the temperature of the polymer mass of the sample increases to 160° C. The test run is performed for 30 minutes. Due to the constant speed of the blades higher viscosity polymers receive more shear and are prone to degrade more than low viscosity ones. Therefore, only polymers with comparable viscosities can be compared with each other.

The color is visually determined after the Brabender testing.

Comparative Example 1

The procedure of Example 2 was repeated, except that prior to the addition of the TNPP/IRGANOX® 565 solution in cyclohexane, 1.0 equivalent (relative to the amount of sec-butyllithium used for obtaining the polymer present in the sample) of benzoic acid was added.

The results are listed in Table II.

Comparative Example 2

The procedure of Example 2 was repeated, except that after the addition of the TNPP/IRGANOX® 565 solution in cyclohexane, 1.0 equivalent (relative to the amount of sec-butyllithium used for obtaining the polymer present in the sample) of benzoic acid was added.

The results are listed in Table II.

Comparative Example 3

The procedure of Comparative Example 1 was repeated, except that instead of benzoic acid, stearic acid was used.

The results are listed in Table II.

Example 3

A sample of 1800 g of the polymer solution obtained in Example 1 was taken and transferred to a 3 l reactor under nitrogen. Then, a cyclohexane solution containing 0.4% wt of TNPP was added whilst stirring and stirring was continued for 15 minutes. A 0.1% wt of IRGANOX® 565 in cyclohexane was subsequently added. The weight percentages of TNPP and IRGANOX® 565 are based on the total weight of block copolymer. During both additions the solution was kept at 60° C. The polymer was subsequently recovered by the procedure described in Example 2.

The results are listed in Table II.

Comparative Example 4

The procedure of Example 3 was repeated, except that the IRGANOX® 565 solution was added first, after which stirring was continued for 15 minutes before the TNPP solution was added.

The results are listed in Table II.

Comparative Examples 5–8

The procedure of Example 2 was repeated, except that different stabilizer packages were used according to Table I. The amounts are expressed in % by weight based on total weight of polymer.

TABLE I

| Different Stabilizer Packages | |
|---|---|
| Comparative Example | Stabilizer Package |
| 5 | 0.1 IRGANOX ® 1010/0.4 TNPP |
| 6 | 0.1 IRGANOX ® 1076/0.4 TNPP |
| 7 | 0.6 BHT/0.4 TNPP |
| 8 | 0.1 SUMILIZER GM/0.4 TNPP |

BHT means 3,5-bis-(tert.butyl)-4-hydroxytoluene.
SUMILIZER GM (2-tert.butyl-6-(3-tert.butyl-2-hydroxy-5-methylbenzyl)-4-methylphenyl acrylate) is a stabilizer available from Sumitomo Chemical Co., Ltd. (SUMILIZER is a trade mark).

The results are listed in Table II.

TABLE II

| MWR and Color Stability | | |
|---|---|---|
| Experiment | MWR (%) | Color |
| Example 2 | 63 | off white |
| Comparative Example 1 | 58 | off white |
| Comparative Example 2 | 58 | off white |
| Comparative Example 3 | 57 | off white |
| Example 3 | 64 | off white |
| Comparative Example 4 | 57 | yellow[1] |
| Comparative Example 5 | 56 | yellow |
| Comparative Example 6 | 56 | slightly yellow |
| Comparative Example 7 | 61 | yellow |
| Comparative Example 8 | 49 | slightly yellow |

[1]This sample was already colored before the Brabender testing.

From Table II it can be seen that the compositions according to the invention exhibit an excellent combination of stability and color without the need of an acid. Fatty acids were used in these comparative examples but aromatic (e.g. benzoic acid) and nonaromatic acids (e.g. saturated dicarboxylic acids) are used for the same purpose of decreasing the color.

Example 9

A styrene-isoprene-styrene block copolymer was made according to a procedure similar to that described in Example 1 using as the coupling agent EPON® 825 resin. This coupled polymer was combined with POLYGARD® HR (tris-(mixed mono- and di-nonyl phenyl) phosphite with triisopropanol amine) and ULTRANOX® 626 (bis(2,4-di-t-butyl) pentaerythritol diphosphite) stabilizers. The polymers were aged at 170° C. for 8, 24, and 48 hours and the Gardner color number determined. The results are shown in Table III below.

TABLE III

| | Gardner Color Numbers | | | |
|---|---|---|---|---|
| Hours Aged at 177° C. | 0 | 8 | 24 | 48 |
| EPON ® 825 Coupled Polymer | 1 | 2 | 5 | 7 |
| EPON ® 825 Coupled Polymer + 0.3 phr POLYGARD ® HR | 1 | 1 | 3 | 6 |
| EPON ® 825 Coupled Polymer (with 0.3 POLYGARD ®) + 0.5 phr ULTRANOX ® 626 | 1 | 1 | 3 | 4 |
| EPON ® 825 Coupled Polymer (with 0.3 POLYGARD ®) + 1.0 phr ULTRANOX ® 626 | 1 | 1 | 2 | 3 |
| EPON ® 825 Coupled Polymer (with 0.3 POLYGARD ®) + 2.0 phr ULTRANOX ® 626 | 1 | 1 | 1 | 2 |

It can be seen that the combination of POLYGARD® and ULTRANOX® 626 stabilizers dramatically reduces the color of the polymer system.

We claim:

1. A block copolymer composition comprising:
   (a) 100 parts by weight of a linear block copolymer comprising two polystyrene endblocks and one poly-(conjugated diene) midblock, which block copolymer is obtained by coupling together two lithium terminated diblock copolymer chains, which have been prepared by anionic polymerization in an inert hydrocarbon solvent using a organomonolithium polymerization initiator, by means of a diglycidyloxy coupling agent consisting of at least one diglycidyloxy compound of general formula (I)

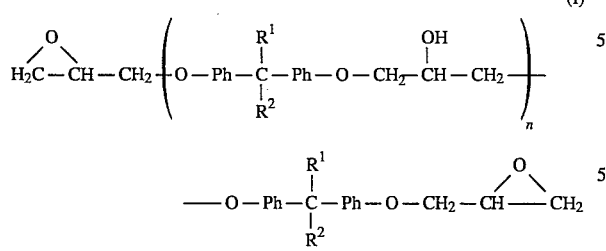

wherein Ph represents a 1,4-phenylene group, $R^1$ and $R^2$ independently represent hydrogen, an alkoxy group or an alkyl group having 1 to 4 carbon atoms and n is an integer of 0, 1 or 2 with the proviso that the diglycidyloxy compound of n=0 constitutes at least 85% by weight of the total weight of the diglycidyloxy coupling agent, said linear block copolymer having a styrene content in the range of from 10 to 50% by weight based on the total weight of block copolymer and a peak molecular weight in the range of from 100,000 to 400,000;

(b) 0.1 to 2 parts by weight of a stabilizer package consisting of:
      (b1) 6-(4-hydroxy-3,5-di-t-butylanilino)-2,4-bis-octylthio-1,3,5-triazine, and
      (b2) a tris-(nonylated phenyl) phosphite, in a weight ratio of b1/b2 in the range of from 0.5 to 0.1.

2. A composition according to claim 1 wherein the styrene content of the linear block copolymer is in the range of from 12 to 40% by weight.

3. A composition according to claim 1 wherein the conjugated diene is butadiene or isoprene.

4. A composition according to claim 3 wherein the conjugated diene is isoprene.

5. A composition according to of claim 1 wherein $R^1$ and $R^2$ of formula (I) both represent methyl and wherein the diglycidyloxy compound of n=0 constitutes at least 90% by weight of the diglycidyloxy coupling agent.

6. A composition according to claim 1 wherein the weight ratio of b1/b2 is in the range of from 0.4 to 0.15.

7. A hot melt adhesive composition comprising:
   (a) 100 parts by weight of the block copolymer composition according to claim 1;
   (b) 20 to 400 parts by weight of a tackifying resin; and
   (c) 0 to 200 parts by weight of a softening agent.

8. A process for the preparation of the block copolymer composition of claim 1 which process comprises the steps of:
   (1) preparing lithium terminated styrene-conjugated diene diblock copolymer chains ("living" chains) in an inert hydrocarbon solvent using an organomonolithium polymerization initiator;
   (2) coupling these diblock copolymer chains by means of a diglycidyloxy coupling agent consisting of at least one diglycidyloxy compound of general formula (I)

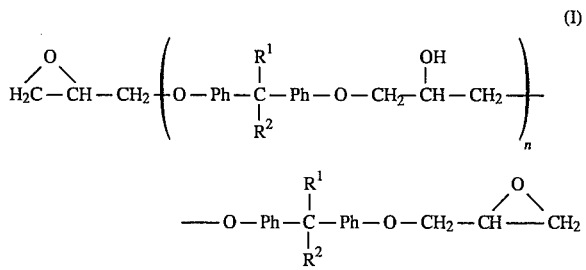

wherein Ph represents a 1,4-phenylene group, $R^1$ and $R^2$ independently represent hydrogen, an alkoxy group or an alkyl group having 1 to 4 carbon atoms and n is an integer of 0, 1 or 2 with the proviso that the diglycidyloxy compound of n=0 constitutes at least 85% by weight of the total weight of the diglycidyloxy coupling agent;
   (3) adding the stabilizer package consisting of 6-(4-hydroxy-3,5-di-t-butylanilino)-2,4-bis-octylthio-1,3,5-triazine and a tris-(nonylated phenyl) phosphite in a weight ratio in the range of from 0.5 to 0.1; and
   (4) recovering the block copolymer composition.

9. A process according to claim 8 wherein $R^1$ and $R^2$ of formula (I) both represent methyl and wherein the diglycidyloxy compound of n=0 constitutes at least 90% by weight of the diglycidyloxy coupling agent.

10. A process according to claim 8 wherein the diglycidyloxy coupling agent is preheated.

11. A process according to claim 8 wherein the different steps of the process are conducted at temperatures in the range of from 40° to 90° C.

12. A process according to claim 8 wherein step (3) is carried out by adding a solution of the stabilizer package dissolved in an inert hydrocarbon solvent.

13. A process according to claim 8 wherein step (3) is carried out by separately adding the components of the stabilizer package as solutions in an inert hydrocarbon solvent whereby the solution of the tris-(nonylated phenyl) phosphite is added first.

* * * * *